US009737812B2

(12) United States Patent
Zadikario et al.

(10) Patent No.: US 9,737,812 B2
(45) Date of Patent: Aug. 22, 2017

(54) METHOD OF INTERACTING WITH AN INTERACTIVE GAME PROGRAM

(75) Inventors: Ofer Zadikario, Raanana (IL); Ran Cohen, Brooklyn, NY (US); Yiftah Frechter, Bitzaron (IL); Oded Cohen, Ramat Hasharon (IL); Hanit Galili, Kfar Saba (IL); Keren Friedman, Ramat Hasharon (IL)

(73) Assignee: Sizmek Technologies Ltd., Herzliya (IL)

( * ) Notice: Subject to any disclaimer, the term of this patent is extended or adjusted under 35 U.S.C. 154(b) by 656 days.

(21) Appl. No.: 11/705,401

(22) Filed: Feb. 13, 2007

(65) Prior Publication Data

US 2008/0194332 A1    Aug. 14, 2008

(51) Int. Cl.
| | |
|---|---|
| *A63F 13/00* | (2014.01) |
| *A63F 13/61* | (2014.01) |
| *A63F 13/352* | (2014.01) |
| *A63F 13/79* | (2014.01) |
| *A63F 13/30* | (2014.01) |
| *G06Q 30/02* | (2012.01) |
| *G06Q 30/06* | (2012.01) |

(Continued)

(52) U.S. Cl.
CPC ............ *A63F 13/61* (2014.09); *A63F 13/12* (2013.01); *A63F 13/352* (2014.09); *A63F 13/79* (2014.09); *G06Q 30/02* (2013.01); *G06Q 30/06* (2013.01); *A63F 13/335* (2014.09); *A63F 13/77* (2014.09); *A63F 2300/209* (2013.01); *A63F 2300/513* (2013.01); *A63F 2300/552* (2013.01); *A63F 2300/5506* (2013.01); *A63F 2300/5546* (2013.01)

(58) Field of Classification Search
CPC ........ H04L 67/22; H04L 67/812; A63F 13/61; A63F 13/12; A63F 13/352
USPC ................................................. 463/1, 40–42
See application file for complete search history.

(56) References Cited

U.S. PATENT DOCUMENTS 6,036,601 A    3/2000  Heckel
6,183,366 B1 *  2/2001  Goldberg .......... G06F 17/30867
                                                    348/E7.071

(Continued)

FOREIGN PATENT DOCUMENTS

EP              1 236 487 A2    9/2002

*Primary Examiner* — Omkar Deodhar
*Assistant Examiner* — Eric M Thomas
(74) *Attorney, Agent, or Firm* — M&B IP Analysts, LLC

(57) ABSTRACT

A software agent interfaces with an interactive game program allowing for dynamic conveyance of objects during runtime for receiving data indicative of at least one parameter relating to a player of the interactive game program and/or to the player station on which the program is run. The data is used to set a dynamic policy that is customized on-the-fly according to the at least one parameter, and which is adapted to determine one or more objects to be conveyed to the player station for dynamically embedding in the program. The dynamic policy is also adapted to determine one or more characteristics of the object and is capable of subsequent re-customization and revision during game play. The objects are retrieved and periodically conveyed to the interactive game program based on the dynamic policy for dynamically embedding in the interactive game program to interface with the game player of the interactive game program.

30 Claims, 7 Drawing Sheets

(51) Int. Cl.
*A63F 13/77* (2014.01)
*A63F 13/335* (2014.01)

(56) References Cited

U.S. PATENT DOCUMENTS

| | | | |
|---|---|---|---|
| 6,193,610 B1* | 2/2001 | Junkin | G06Q 10/107 463/40 |
| 6,196,920 B1* | 3/2001 | Spaur et al. | 463/42 |
| 2004/0116183 A1 | 6/2004 | Prindle | |
| 2004/0148221 A1* | 7/2004 | Chu | A63F 13/12 705/14.51 |
| 2004/0193441 A1* | 9/2004 | Altieri | 705/1 |
| 2006/0105841 A1 | 5/2006 | Rom et al. | |
| 2006/0128469 A1 | 6/2006 | Willis et al. | |
| 2006/0128471 A1 | 6/2006 | Willis et al. | |

* cited by examiner

METHOD OF INTERACTING WITH AN INTERACTIVE GAME PROGRAM

FIELD OF THE INVENTION

This invention relates to in-game advertising.

BACKGROUND OF THE INVENTION

In-game advertising is becoming an increasingly popular approach to increase the reach of advertisers. For the advertisers games provide another media channel that widens the reach. For game developers, games publishers and game distributors it provides a highly lucrative revenue stream. Digital games downloaded for free, featuring trial or demo versions, generate a low conversion rate (the ratio of the number of trials/demos downloaded to the number of purchased full versions). Ad-supported games introduce a supplemental revenue model. Similarly, the price of purchased games can be subsidized by ads.

In-game advertising can operate at a number of different levels. In-game light integration is used to serve advertisements to the game environment in a transition screen during stages such as before the game starts, between game stages, after the game ends and the like. In-game tighter integration presents rotating textures and videos during the game on billboards, buildings etc. Product placements present non-rotating texture during the game on billboards, buildings etc.

The world of digital games reflects a chain of players:

Game Developer—the entity that developed the game code, like an author in the book industry. The game developer has access to the game source code and is the proprietor of the IP rights in the game.

Game Publisher—the entity that publishes the game, like the book publisher in the book industry. This entity may integrate the game with a Digital Rights Management (DRM) wrapper. DRM is a digital component that prevents unauthorized copying of the game, enables the setting of time limits to a downloaded game, and is capable of identifying and reporting on game events.

Game Distributor—the entity that distributes/sells the game (online or offline), like a book store.

Media Seller—the entity that sells the created ad inventory in the game.

US 2006/105841 (Rom et al.) published May 18, 2006 discloses a system for displaying objects within an interactive game program, in which, the objects can be added during the game program creation and afterwards. Additionally, a component within the game program itself updates these objects and communicates with a centralized server that manages and controls the objects through a number of utilities. One embodiment of the invention is a system providing dynamically changing advertisements within interactive video games. Additionally, a centralized server communicates with an internal Ad Engine to update interactive game ads without impeding on the game performance or affect the game play in any unintended way. Furthermore, the invention provides various management suites for interactive game program developers, game program publishers, and advertisers to update and manage the advertising objects within the game program.

US 2006/105841 also suggests creation of ad objects in an interactive game program both at its creation and after publication and release, para. 0055. But it appears neither to suggest nor describe a mechanism that allows for pre-definition of a set of multiple ad policies, determining ad display and frequency, and the corresponding game states and events in which each will be allocated, and for centralized automated on-the-fly allocation and customization of such predefined ad policies to digital games one or more times during the game play, with the ad policies being accessible at the server for revising, and any revisions having immediate effect including on games then-currently played under such revised policy, subject to a predefined server-software agent ad policy updating frequency, as specified below.

US 2004/148221 (Chu) published May 25, 2006 discloses an online game advertising system providing an architecture for enabling the definition, sales, distribution, and management of interactive advertisements, sponsorships, and placements that appear within an online video game as part of the game experience or during idle load, wait, and pause screens. For example, in a race car game, when a driver pulls in for a pit stop, the engine oil brand that the game player may choose may be defined as locations for advertisements or product placements for real life engine oils and game publishers and advertisers may manage what specific advertisements to place in these locations.

US 2006/128471 (Godse et al.) published Jun. 15, 2006 discloses a virtual environment of a video game provided with a set of predetermined objectives, whose completion is monitored and recorded. This information is then provided to a game developer. In addition, comparing the record of the predetermined objectives with current game assets associated with the gamer serves to inhibit authorized duplication of game assets.

US 2006/128469 (Freedman et al.) published Jun. 15, 2006 relates to presentation of an advertisement during a video game session supporting a set of gamers participating in the game from a variety of different locations. The content of the advertisement is chosen based upon specific criteria such as data relating to one of the gamers, for example, the location of the gamer. The chosen content of the advertisement is provided within an advertising spot of the video game.

EP 1236487 (Aoki) published Sep. 4, 2002 discloses a method for directing a player's attention to a game advertisement so as to generate more game advertisement charges. An amount to be charged for outputting a game advertisement is calculated based on displayed amount information, e.g., information concerning a display time and area, and display quality information, e. g., information concerning a display position on a game screen, presence or absence of clipping with an advertisement image, an advertisement display direction in a vertical 3D space, and so forth.

U.S. Pat. No. 6,036,601 (Heckel) published Mar. 14, 2000 discloses a method for advertising within the virtual environments of games. Default images of games are replaced by alternative textures having advertisements implemented therein. An ad server coordinates the matching of ads to demographic data of the game player and properly accommodates ads in formats from game information provided by game sources. The game player is visually influenced by advertisements as he or she views the virtual world of the game, as plug-in software replaces the default images with virtual pictures and figures utilizing an advertisement. View statistics are retrieved from the game player's computer or console to rate viewing effectiveness for ad placement confirmation and billing purposes.

US 2004/116183 (Charles) discloses a system and method for digitally inserting advertisements, targeted digital images, indicia and live digital video streams into a networked, a multi-player or on-line video game, using a color mask or a matte technique such as blue screening, within the video game, in order to display the information within the video game. Each video game client has software executing on the video game client, which is connected to a video game network server, and which is capable of displaying images, video, audio and data originating from the network server or from other medium. The video game client is capable of display on a standard television set. Each client comprises a networked interface card (NIC) or modem, a network connection, and software executing on the video game client that can establish a client-to-server network connection. Each client supports video streaming and can receive, and encode and decode video and audio signals, transport, and display that and other data on screen.

The above-referenced publications teach the display of advertisements dynamically during game play as well as the ability to customize advertisements to specific users based on demographic data of the game player, for example. To this extent, techniques taught by some of these references may also be applicable to the present invention and their contents are wholly incorporated herein by reference.

There appears to be no suggestion in the art to allow an advertisement policy to be customized on-the-fly based on feedback received from a game station during play so as to allow for the definition of advertisements' display characteristics during game play, and to further allow on-the-fly re-customizing of another advertisement policy and/or on-the-fly revising of a previously allocated advertisement policy. Further there appears to be no suggestion in the art as to a single generic method enabling display of video-audio synchronized files to be displayed on any environment that is capable of displaying graphical textures, including a 3D environment.

SUMMARY OF THE INVENTION

The invention provides a mechanism for defining and displaying advertisements dynamically during game play as well as the ability to customize display and frequency of advertisements to specific users based on a dynamic advertisement policy that is customized on-the-fly and may be subsequently revised on-the-fly based on one or more parameters received from a game station during play.

The invention provides a mechanism for the owner of the advertising rights in a game to dynamically create ad inventory in the digital games environment and to enable delivery and tracking of ads thereto. The invention further provides a mechanism that facilitates real time communication between a game station on which the game is played and a publisher ad server according to an ad policy determined on-the-fly by a policy management server, based on one or more parameters fed to the policy management server by the play station during actual play. Once the publisher ad server is called by the game to download an ad, it returns tags of an agency ad server where the ad is stored as an advertising object, accessible by a known URL, and the ad is ultimately displayed. In addition, the invention allows tracking of different interactions of the game player with the displayed ads and reporting of such interactions to the agency ad server.

The invention also provides a mechanism to leverage targeted advertising capabilities based on static data defined during the creation of the game such as game genre, game language and the like, and dynamic user-specific data such as user registration information, third party cookies or special events occurring throughout the game play. In addition, given that the game operates as a standard advertising platform, the owner of the ad inventory may employ platform tools to manage the types of ads allowed in the game, including reviewing the ads before display.

Within the context of the description and claims, no distinction is made between 'ad', 'advertisement' and 'advertising object'.

The invention provides a software agent that is installed on the end user machine (also referred to as 'client machine'). The software agent includes a software library with an API (Application Program Interface) that provides the basic functionality of displaying digital ads in various environments. Behind the public interface are encapsulated all other responsibilities such as state management, tracking and serving logic. The software agent provides for a customized advertisement policy to be set and revised on-the-fly, thus facilitating delivery to supported games of ads that may vary in content and frequency for different users and games, based on real time dynamic "decision making". The software agent provides detailed advertisement display tracking for each game played by each particular user and reports the advertising revenue share of each entity that contributed to generation of these revenues, such as the game developer, game publisher and game distributor.

According to a first aspect of the invention there is provided a method of interfacing with an interactive game program allowing for dynamic conveyance of objects during runtime, said program interfacing with a software agent, the method comprising:

receiving data indicative of at least one parameter relating to at least one of a player of the interactive game program, the interactive game program and the player station on which the program is run;

using said data to set a dynamic policy that is customized on-the-fly according to said at least one parameter, said dynamic policy being adapted to determine one or more objects to be conveyed to the player station for embedding in the program, said dynamic policy being adapted to determine one or more characteristics of the objects, said dynamic policy being capable of subsequent modification during game play; and retrieving and periodically conveying the objects to the interactive game program based on said dynamic policy for embedding in the interactive game program.

According to another and complementary aspect of the invention there is provided a software agent for interfacing with an interactive game program run on a player station, the software agent comprising a display driver for acquisition and display by the game program of a video sequence at a predetermined video stream rate and at a screen location configurable by the game program, further synchronized with a sound stream.

In accordance with an embodiment of the invention, the software agent comprises:

a flow coordination module for conveying to a policy management server first data indicative of at least one parameter relating to at least one of a player of the interactive game program, the player station on which the program is run and the interactive game program so as to allow the policy management server to use said data to set a dynamic policy that is customized on-the-fly according to said at least one parameter, said dynamic policy being adapted to determine one or more objects to be conveyed to the player station for embedding in the interactive game program, said dynamic policy being also adapted to determine one or more characteristics of the objects; and said flow coordination module further receiving second data indicative of at least one parameter relating to at least one of a player of the interactive game program, the player station on which the program is run and the interactive game program so as to allow the flow coordination module to use said second data to customize on-the-fly said dynamic policy according to said at least one parameter;

a game interface for retrieving and periodically conveying the objects to the interactive game program based on said dynamic policy for embedding in the interactive game program.

The software agent is a Java script based software incorporating objects that enable communication with the servers. Internal communication (with the game wrapper and cache) is in Java script and the external communication with the servers is in HTTP. The software agent enables creation, delivery based on on-the-fly dynamically changeable advertisement policy, management and reporting of dynamic advertisements in digital games, including display of video-audio content in 3D environment.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EMBODIMENTS

Figure 1:
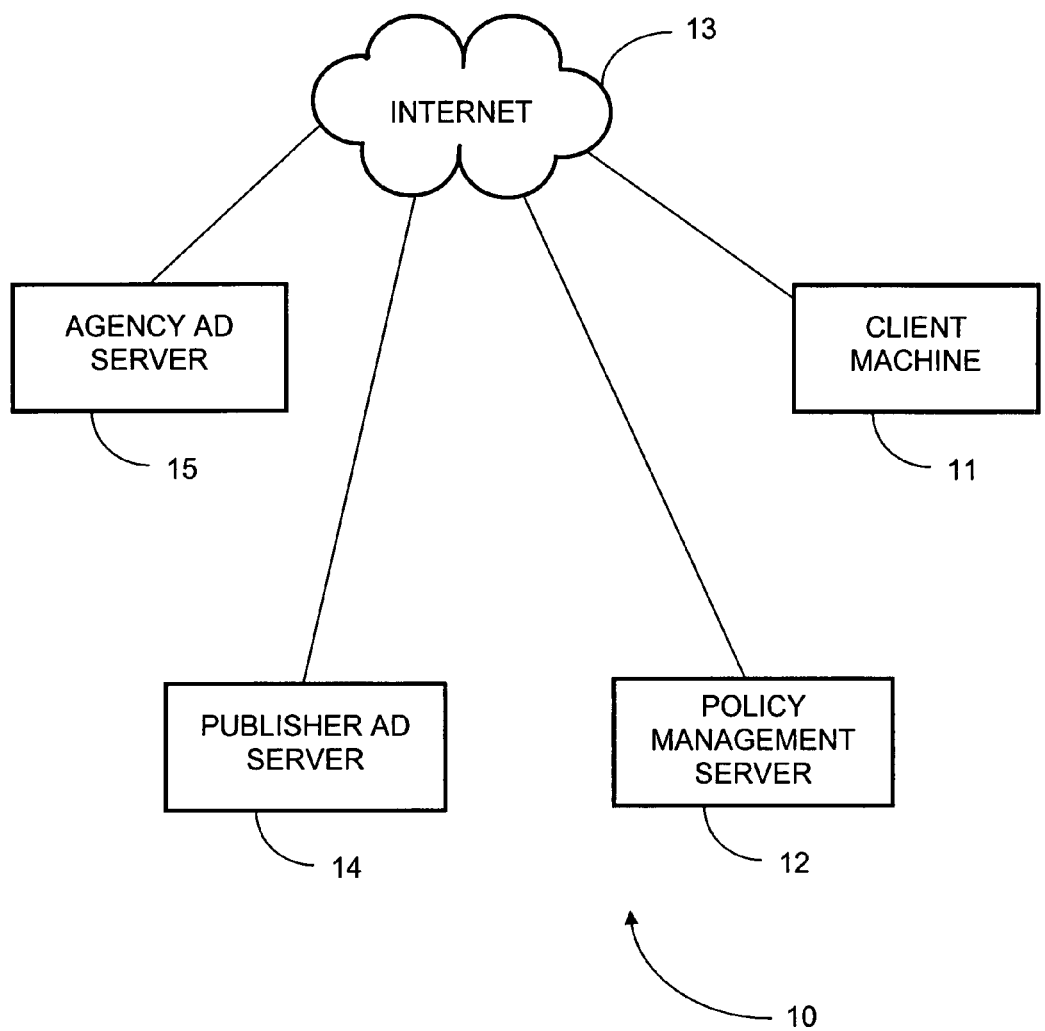
FIG. 1 is a pictorial representation of a system according to an embodiment of the invention for facilitating dynamic runtime interaction with an interactive game program.

FIG. 1 is a pictorial representation of a system 10 comprising a client machine 11 on which a user (not shown) plays an interactive game program that has an interface to a policy management server 12 to which it is coupled via a data network, such as the Internet 13. The interactive game program can itself be downloaded over the Internet or it can be an Internet game that is accessed from a remote game server. So far as the invention is concerned the source of the game is not important so long as it is provided with a software agent that provides an interface to the policy management server 12, and allows dynamic conveyance of data into the interactive game program during runtime, according to a runtime customized and subsequently revisable advertisement policy. Also connected to the Internet 13 are a publisher ad server 14 and an agency ad server 15 that operate in known manner to serve advertisements to the client machine 11. The software agent in the client is configured to download advertisements from the agency ad server 15 during running of the interactive game program based on an advertisement policy dictated by the policy management server 12. Such advertisements can be downloaded in one of three ways: streaming, pre-fetching and progressive download, this being known per se.

It will be understood that the client machine 11 may be any suitable device that is operative to run a game program either while coupled to the Internet (or other suitable network such as a VPN and the like) or in offline mode, as will be further specified below. Most commonly client machine 11 is a computer such as a PC but it may also be a PDA, mobile telephone, console game machines, IPTV and any other such game program device.

Figure 2:
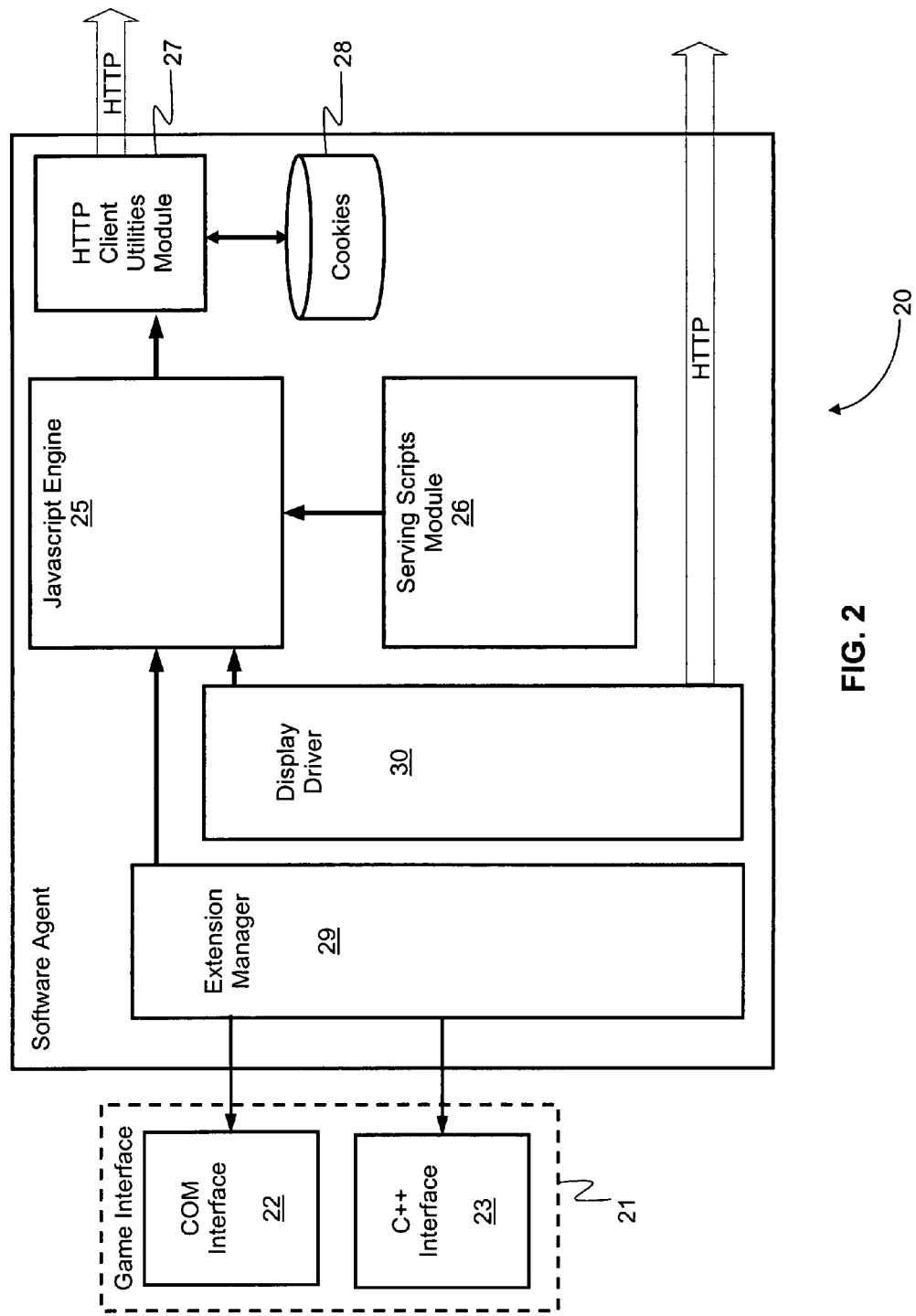
FIG. 2 is a block diagram showing functionality of a software agent according to an embodiment of the invention.

FIG. 2 is a block diagram showing functionality of a software agent 20 according to an embodiment of the invention that is suitable for interacting with the policy management server 12. The interactive game program may be integrated with the software agent 20 as will typically be done in standalone game programs that are supplied by independent outlets, such as stores and the like. But it is sufficient for the interactive game program to have an interface to the software agent 20 so that once the software agent 20 is loaded in the client machine 11 one or more interactive game programs may interface with the same software agent 20. This allows the client machine 11 to download multiple on-lines games from a common source while downloading the software agent 20 once only.

The software agent 20 comprises a game interface 21 that allows the software agent 20 to be directly interfaced to the game engine via a COM interface 22 or via a C++ interface 23. For games that are not written in C++ suitable adapters may be provided that are coupled to the C++ interface 23 and allow interface conversion to the game engine technology. For example, some engines are built using higher level languages than C++ and in such case, the adapter will allow the software agent 20 to interface with the game engine. It will be appreciated that provision of the C++ interface 23 is by way of example only, and other programming language interfaces may be provided, particularly in cases where the software agent 20 is pre-installed with a purchased game program.

Likewise, the software agent 20 is provided with a JavaScript engine 25 that allows the software agent 20 to interface with external JavaScript objects. Java and JavaScript are registered trademarks of Sun Microsystems Inc., Santa Clara, Calif., USA. A serving scripts module 26 is coupled to the JavaScript engine 25 and allows external Java scripts to be loaded to the JavaScript engine 25 for execution thereby. The serving scripts module 26 is in charge of the serving decision for both the publisher ad server 14 and the client machine 11. All serving logic is implemented in JavaScript. The JavaScript engine 25 is coupled to an HTTP client utilities module 27 that allows the software agent 20 to interface with the Internet using the HTTP protocol. By such means the software agent 20 can download Java scripts and instructions over the Internet and can upload data during the execution of the interactive game program. The HTTP client utilities module 27 also allows interface with data stored in the form of cookies 28 on the client machine 11.

An extension manager 29 (constituting a flow coordination module) within the software agent 20 is coupled to the game interface 21 and to the JavaScript engine 25 and coordinates flow between various modules in the software agent 20. A display driver 30 is likewise coupled to the JavaScript engine 25 and controls how an advertisement downloaded by the software agent 20 is displayed. The display driver 30 is described in greater detail below with reference to FIG. 3 of the drawings.

Figure 3:
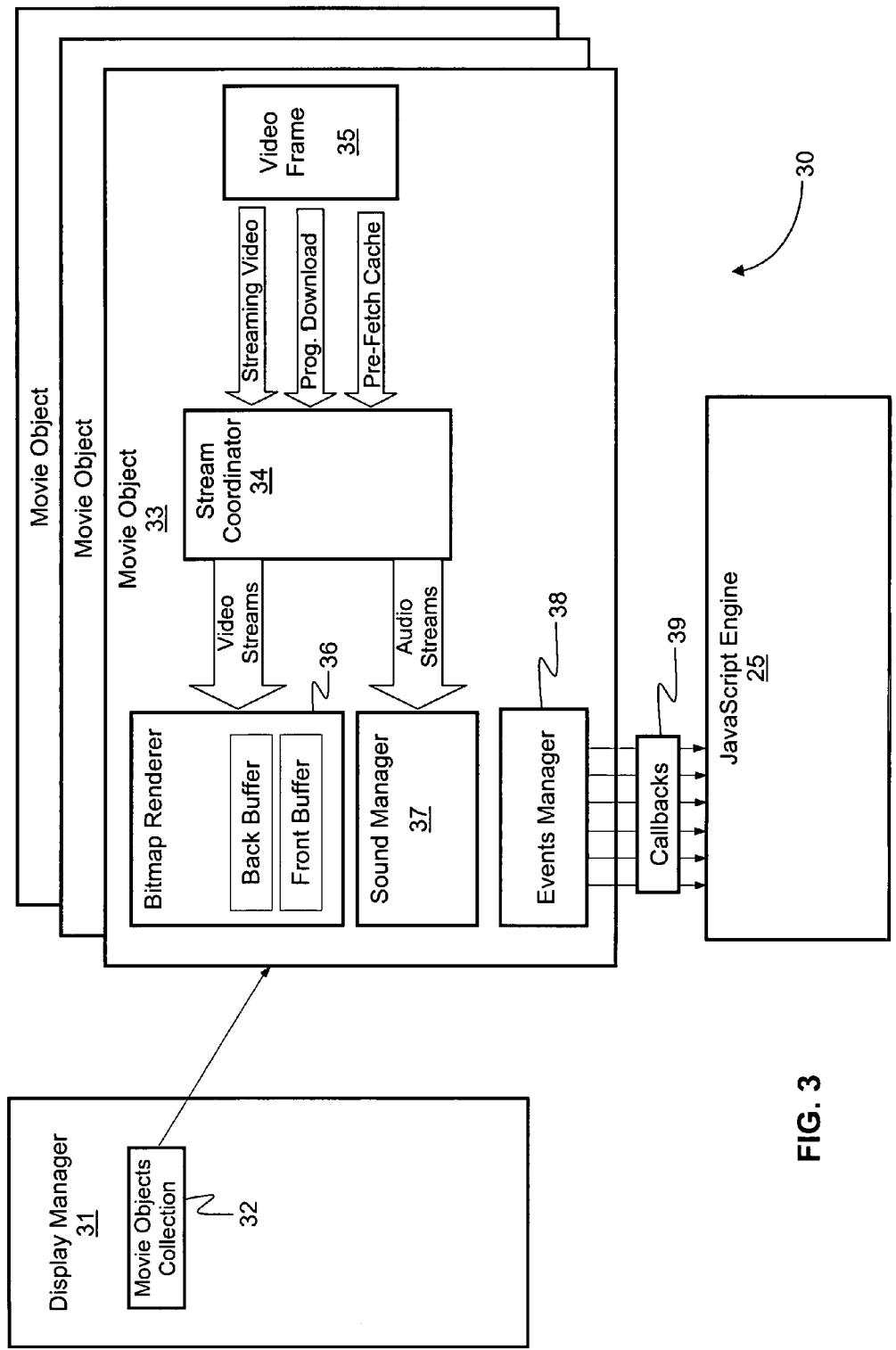
FIG. 3 is a block diagram showing details of a display driver within the software agent shown in FIG. 2.

FIG. 3 is a block diagram showing details of the display driver 30. The display driver 30 includes a display manager 31 that contains a movie collection 32 which is a dynamic list of all advertisement movie objects 33 that are currently required to be played by the game. Each movie object 33 has an interface to the JavaScript engine 25 and thus can be manipulated by Java scripts that are downloaded by the software agent 20. The display driver 30 comprises a segmentation module that segments the movie file into discrete frames and a stream coordinator 34 that is responsive to such a Java script for downloading a video frame 35 using a download mechanism dictated by the Java script, thus allowing the frame to be downloaded as streaming video, or via pre-fetching or progressive download as required. The stream coordinator 34, constituting a buffering module, processes the video frame 35 to create separate but synchronized video and audio streams that are fed respectively to a bitmap renderer 36 and a sound manager 37. An events manager 38, constituting an emulation module, issues callbacks 39 that are processed by the JavaScript engine 25 and conveyed to the agency ad server and to the publisher ad server 14 for compiling usage statistics etc.

As will be described below with reference to FIG. 5, game objects are formed of polygons that are interconnected to give the impression of 3D objects. The software agent superimposes the bitmap frames on the polygon environment, one after the other, and further synchronizes the frame flow with the sound stream, thus creating an illusion of video and enabling display of video on the 3D environment. The game rate is higher than the required video rate. Therefore, not every time the platform refreshes, a new video frame has to, displayed, but rather once every few times. The video may be refreshed at a lower rate than the refresh rate of the game platform.

Figure 4:
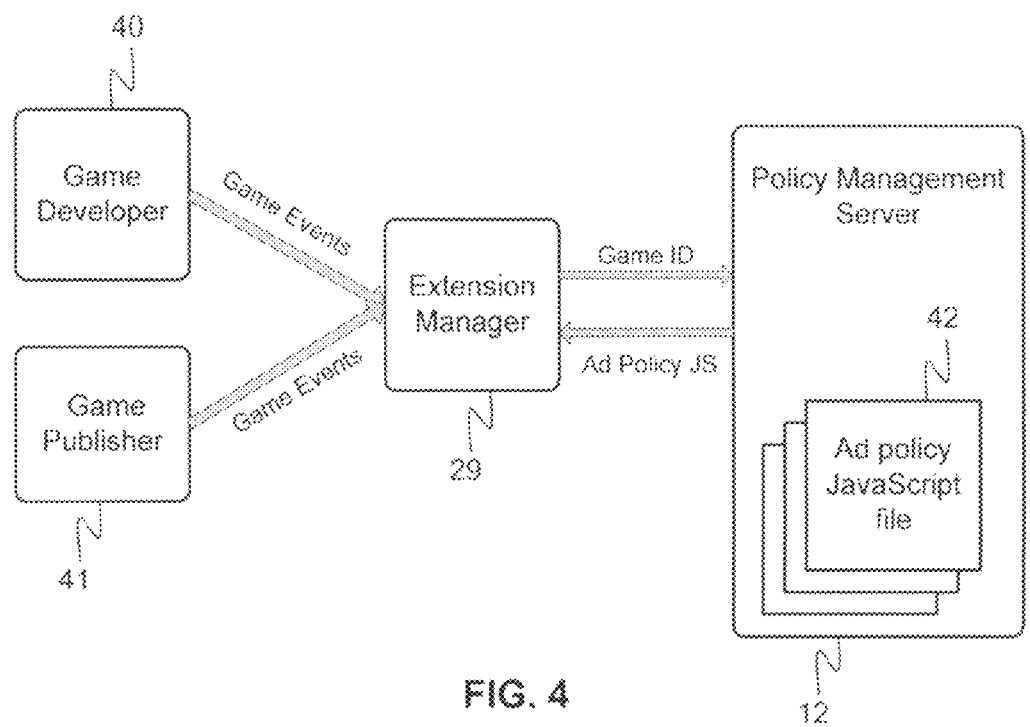
FIG. 4 is a block diagram showing details of an extension manager within the software agent shown in FIG. 2.

FIG. 4 is a block diagram showing details of data flow between the extension manager 29 and the various 'players' in the ad scenario. The extension manager 29 is the public interface to the game engine and wraps the display modules, serving flow modules and all the other specialized modules. The game engine invokes the extension commands via the COM interface 22 and the DLL C++ interface 23. The extension manager 29 also includes a Machine State Collector (not shown) which is in charge of collecting all the relevant information about the machine state (such as bandwidth, OS type, installed libraries etc. . . . ) for the sole purpose of determining the machine's display capabilities. The extension manager also contains the JavaScript interface classes for the remaining inner modules.

Figure 7:
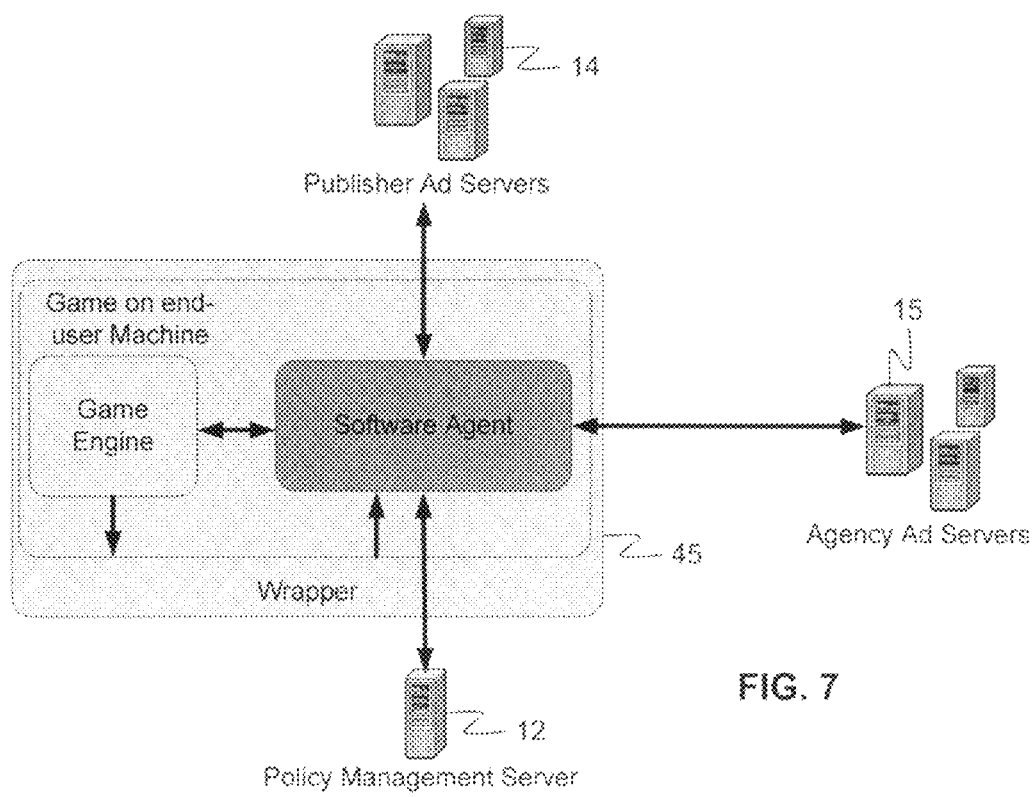
FIG. 7 is a schematic representation showing data interaction between the software agent and external agents coupled thereto.

As will be described in greater detail below with particular reference to FIG. 7 of the drawings, the extension manager 29 responds to events that are set by the game developer 40 and by the game publisher 41 as well as to an ad policy fed thereto by the policy management server 12. To this end, the policy management server 12 receives the game ID from the extension manager 29 and returns to the extension manager 29 a respective ad policy JavaScript file 42, which is retained and enforced by the extension manager 29.

During play, ads are then served to the game according to the ad policy currently stored in the extension manager. When the game is initiated and consequently the extension manager is initiated, the policy management server communicates to the extension manager a corresponding ad policy JavaScript file (the mechanism for matching between a game and an ad policy is specified below). The ad policy file is cached in the extension manager for a predefined time period in order to optimize the number of calls to the policy management server. As the game proceeds from initiation onwards, each time the game engine calls the software agent 20 for an ad, the extension manager decides whether an ad should be displayed according to the ad policy and the then-current game event, as reported by the game wrapper, shown as 45 in FIG. 6. The communication between the extension manager and the wrapper depends on the manner of integration between them—either the extension manager draws the current status game event upon a request for an ad, or the wrapper actively reports the initial and, as the case may be, updated, status game event. The extension manager comprises, inter-alia, counters supporting time-related and history-related ad policies. A counter counting the time that lapsed from the previous ad display may support a time-based frequency policy (i.e. ad display every n minutes). A counter counting levels/stages may support an event-based frequency policy (i.e. ad display every n stages/levels).

Video Display on 3D Environment

Figure 5:
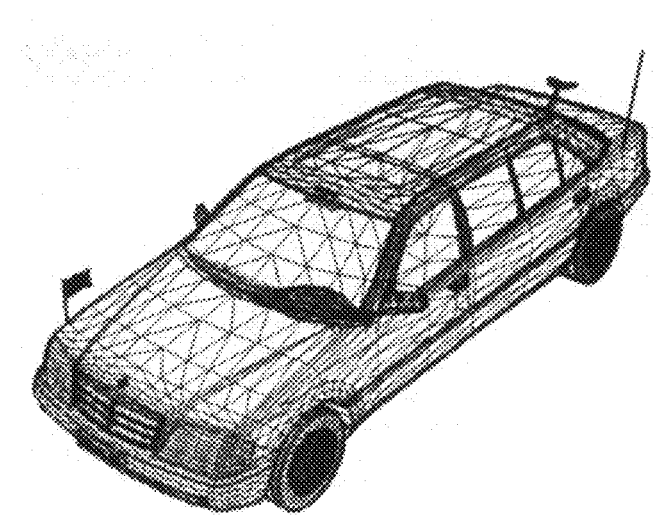
FIG. 5 is a pictorial representation of an object that may be used to display a dynamic advertisement in accordance with an embodiment of the invention.

FIG. 5 is a pictorial representation of a car, constituting a 3D game object that may be used to display an advertisement in accordance with an embodiment of the invention. In order to allow such 3D objects to display video they are constructed from multiple 2D polygons that are interconnected in a lattice. The display driver 30 exploits the high frame rate at which known 3D engines can attach textures to these polygons. To this end, the display driver 30 splits the downloaded movie into frames from which it generates bitmaps. The bitmaps are then used on selected polygons in the 3D object. Each time the 3D object refreshes itself, the software agent 20 will return the bitmap representing the current frame in the movie. Repeating this mechanism at a high frame rate creates the illusion of video inside the polygon.

Figure 6:
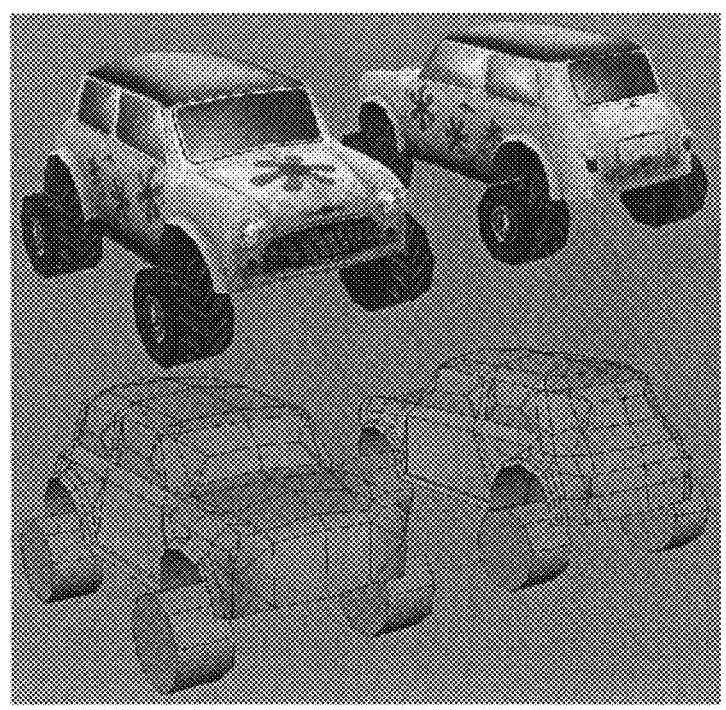
FIG. 6 is a pictorial representation showing various objects that are used to display dynamic advertisements according to an embodiment of the invention.

FIG. 6 is a pictorial representation showing various objects that may be used to display video advertisements according to an embodiment of the invention. Thus selected surfaces of the cars may be used to display successive bitmap representations of a sequence of video frames at sufficiently high rate to avoid video flicker. According to another embodiment of the invention, video advertisements may also be displayed as a layer on top of the 3D game objects, without a particular 3D game object or a part thereof outlining the advertisement.

In-Game Advertising Flow and Advertising Policy

As noted above, the software agent 20 interfaces between the game engine and the policy management server 12, so as to allow an advertising policy relating to the embedding of in-game advertisements to be customized on-the-fly according to one or more parameters, which are conveyed to the policy management server 12 by the game engine. Based on these parameters, the policy management server 12 customizes an ad policy on-the-fly, which, in turn, determines one or more advertising objects to be conveyed to the player station for dynamically embedding in the program and determines a frequency at which the advertising objects are conveyed.

The ad policy mechanism is implemented by means of a Java script file that inputs a parameter and outputs a true or false response—whether or not an ad should be served. During the game play, parameters are continuously conveyed to software agent 20. The software agent 20 may, pursuant to some of the parameters, re-customize and re-set on-the-fly a new and different advertising policy for the game, as will be further illustrated below. Further, the advertising policies may at any time be accessed at the policy management server 12, where they are stored, and revised according to changing needs and considerations. The advertising objects are stored in the agency ad server 15.

Figure 8:
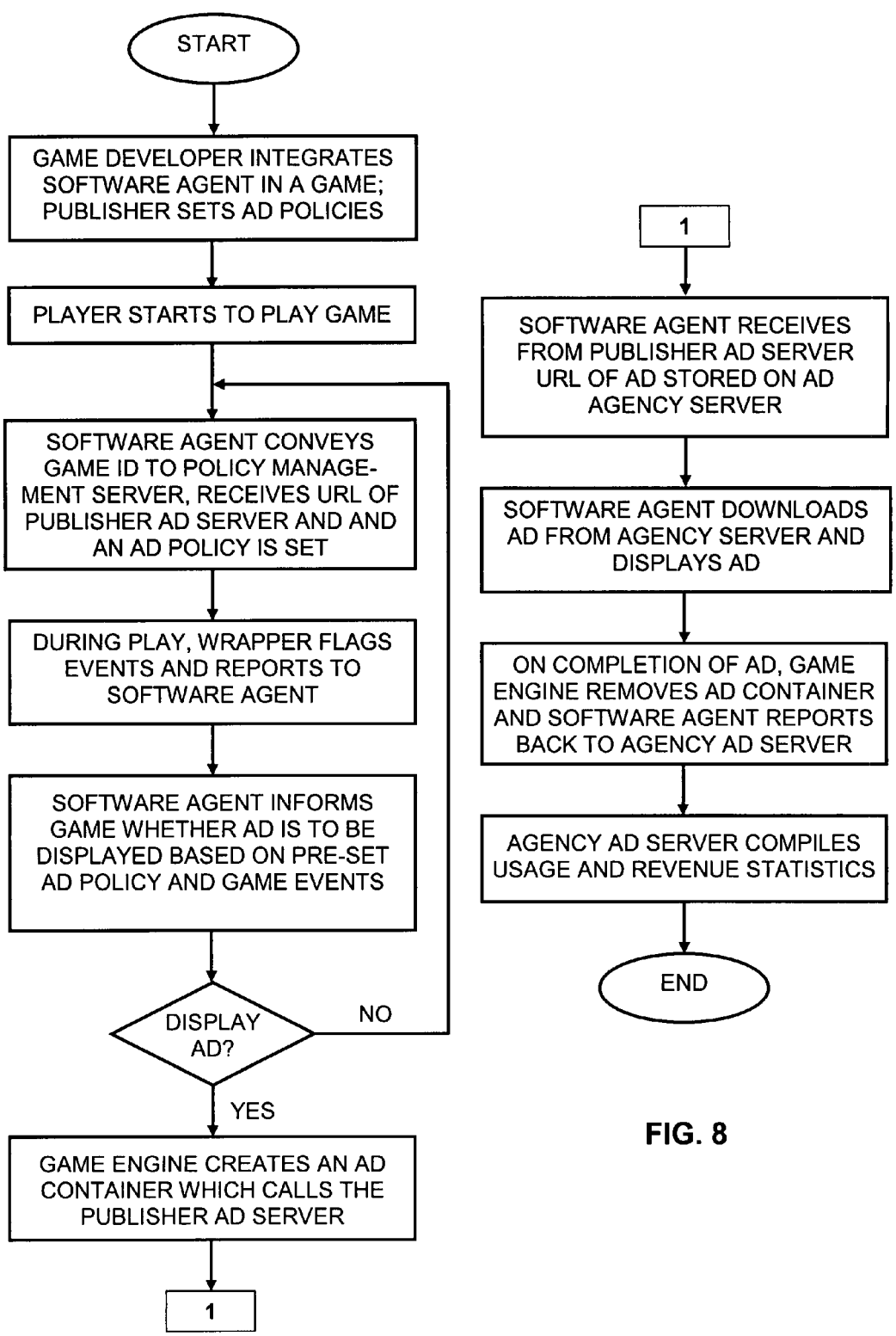
FIG. 8 is a flow diagram showing the principal operations carried out by and in association with the software agent according to a typical scenario.

A typical scenario will now be described with reference to FIGS. 7 and 8 of the drawings. The game developer 40 (shown in FIG. 4) integrates the software agent 20 in a game, to create a game within which advertisements may be displayed (hereinafter: "enabled game"), and programs various locations in which advertisements may be displayed (including the possibilities of (i) within objects in the scenario of the game, (ii) between levels/stages in a layer on top of the game, (iii) an ad-reminder in a layer on top of the game, etc.).

The policy management server 12 sets a unique ID for the game, based, inter-alia, on data supplied by the game developer. The ID includes the following information: title, identity of developer, publisher and distributor, genre and sub-genre (sports {tennis, football}, trivia, first shooter, board game, etc.), language and rating (for what age range, whether containing violence, etc.).

The game publisher 41 carries out further integration by communicating to the software agent 20 definitions and settings regarding the game events. A game event provides information regarding the status of a game or an occurrence within a game. Examples of status game events—free trial version, extended trial version, discounted version, paid version. Examples of occurrence game events—game load, game starts, passage between game levels, end of game.

The game publisher 41 sets his ad policies 42 on the policy management server 12. An ad policy is a mechanism that determines the frequency, instances and/or locations throughout the game in which ads are to be displayed, for example:

when the game loads (on-load),
  before the game starts (pre game),
  after the games ends (post game);
  between levels/stages (commonly known as interstitials);
  within game objects; and/or
  ad-reminders.

When a user initiates a game, the software agent calls the policy management server 12 with the game ID.

Based on the game ID, the policy management server 12 determines and sets an ad policy, and communicates it to the software agent 20. The policy management server 12 also sends the URL of the publisher ad server 14 to the software agent.

The game wrapper reports to the software agent 20 the status game event and will subsequently report a new status game event, as the case may be, which in turn will cause a different ad policy to become effective.

As the game proceeds, status and/or occurrence events are reported from the wrapper to the software agent 20, with a request for an ad, which is substantially in the form of a question—will an ad be served or not?. Based on the ad policy stored in the software agent 20 and the event that is reported thereto, the software agent 20 returns either a "TRUE" or a "FALSE". For example, if, according to an ad policy, an on-load ad is to be delivered, then upon loading of the game, the game wrapper notifies an on-load event, the answer returned is "TRUE", and as a result the game engine creates an ad container in the pre-programmed ad display location, into which an advertisement will be served.

The ad container calls the publisher ad server 14 at the URL previously provided to the software agent.

The call to the publisher ad server 14 includes information that enables the publisher server to deliver a targeted ad, for example:

Placement of the ad container—on-load, pre-game, interstitial, post-game, and others;
Game ID including, among others, game genre and sub genre, language, rating;
User's platform—computer, cellular, console, IPTV and others;
User registration info—if previously collected.
Third party cookie information.

In response, the publisher ad server 14 returns HTML tags that call the agency ad server 15 and an ad is served to the ad container. When the ad is over, the container disappears.

A report regarding the ad delivery is sent back to the agency ad server 15, including usage data indicating whether or not there were an impression, loading duration, ad duration, clicks, etc. This provides feedback of a player's interaction with the ad from which the ad agency server 15 can determine user interest and ad efficacy.

Based on the association between the impressions and the corresponding game ID, the agency ad server 15 allocates the revenues, according to a pre-defined revenue share, to all entities associated with that particular ad, i.e., game developer, game publisher and game distributor.

Some events may result in re-customizing the effective ad policy. For example, if a player responds to a certain partial or full purchase suggestion in the affirmative and performs the suggested purchase by providing requested credit card details, a corresponding status event will be communicated to the software agent 20, that may result in on-the-fly allocation of a different ad policy that provides for a lower ad display frequency or no ad display at all.

At any time, any ad policy may be accessed at the policy management server 12 and revised, typically by a game publisher, according to then-current needs and considerations. The next time that this ad policy is set to a game, the revision will already be effective. As for games that will then be currently played under that policy, the revision will take effect when the ad policy file at the software agent 20 expires pursuant to a predetermined duration, at which time the software agent 20 will call the policy management server 12 requesting the-then current ad policy file.

Offline Messages

When a user goes online and downloads a game, cache ads are stored on a central location on the user machine. If the user plays in an offline mode, the cache ads are delivered across any enabled games played on this machine. The ads rotate and a frequency cap is activated. In the event the frequency cap prevents serving all the ads, a house ad (advertising, for example, the publisher) downloaded with the game is served (the same happens if the game is bought on a CD and played offline prior to connecting to the Internet). When the user goes online again, a report is delivered for every ad as described above.

Implementation

Having described the interaction between the different operators in the system 10 shown in FIG. 1 that allows a dynamic advertising policy to be customized on-the-fly during actual game play, there will now be described with reference to FIGS. 9 and 10 how the mechanism provided by the invention can allow enhanced marketing strategies to be employed so as to increase revenues.

Figure 9:
FIG. 9 is a pictorial representation showing a typical prior art strategy for on-line marketing of a game.

FIG. 9 is a pictorial representation showing a typical prior art strategy for on-line marketing of a game where an on-line user can play the game for a limited trial period. At the end of trial period he must either enter a license code indicating that he has purchased the game or he must purchase the game so as to obtain a license code. In effect this scenario facilitates direct communication between a prospective purchaser and an on-line vendor, but the only feedback that the vendor obtains is whether or not the user decides to purchase the game.

Figure 10:
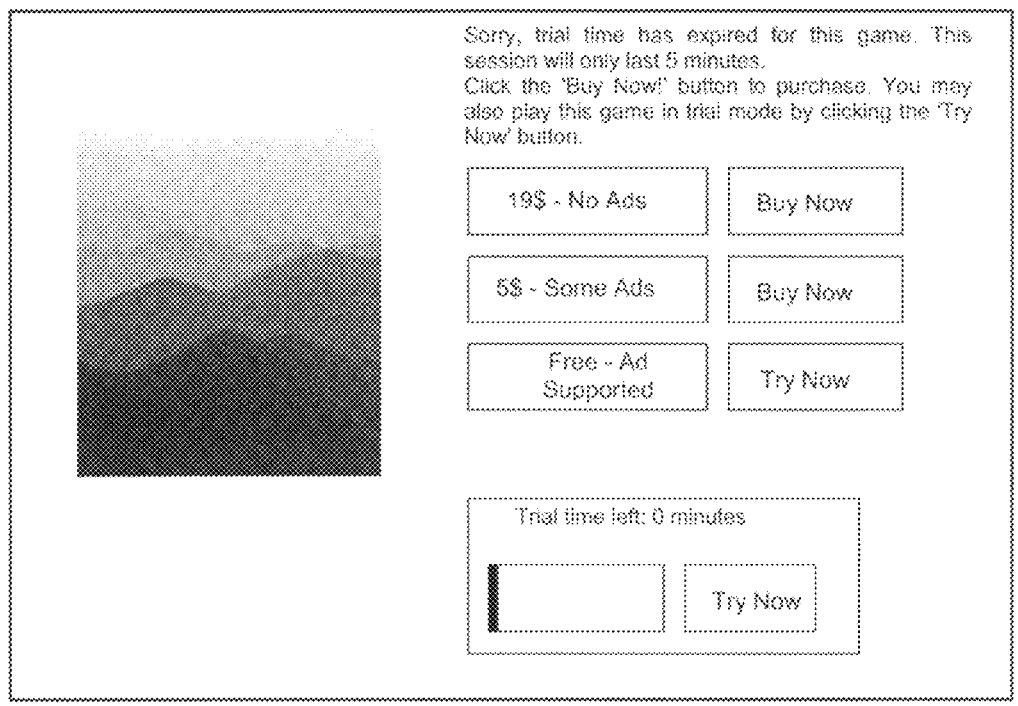
FIG. 10 is a pictorial representation showing an enhanced strategy for on-line marketing of a game according to the invention.

FIG. 10 is a pictorial representation showing an enhanced strategy for on-line marketing of a game facilitated by the invention. When the game is downloaded and the player starts playing (not shown), a trial period is provided for, and an initial ad policy is allocated that may define display of some ads or no ad display at all, depending on the publisher's business concepts and strategies. During the trial period or when it has lapsed, a new screen is presented allowing the player to buy the game (as before) but also allowing him to continue running the game or a version thereof for free while permitting on-line advertisements to be displayed. If this option is selected, an ad policy corresponding to this option is allocated, which, in turn, determines the frequency at which such advertisements are displayed. The advertisers pay for the display of these ads and, in so doing, finance the continued free trial period. Alternatively, the player may opt to pay a modest sum that allows him to purchase the game or a version thereof for a reduced sum compared with outright purchase. The difference is at least partly financed by advertisers whose ads are served to the game during play, albeit at a lesser frequency than during the free trial option, such frequency being determined by the corresponding ad policy that was allocated.

The invention described herewith provides a mechanism for determining and subsequently revising ad display characteristics in a centralized automated manner for an entire game. This is very different from prior art disclosed methods that allow for setting characteristics separately and individually for different particular ad objects, such that editing any one specific preset characteristic necessitates particular manual and separate access to that specific characteristic at the specific ad object. Further, the mechanism allows for one particular game to be played by a number of different simultaneous players under different ad policies, since different publishers posting the game on their websites have defined different ad policies for that game, and/or since different players made different decisions regarding the amount to be paid for the game, if at all.

It will be appreciated that modifications may be made to the invention without departing from the scope as defined in the attached claims. Thus, while the in-game objects have been described with particular reference to advertising objects, it will be understood that the objects provide a communication channel from a server into the game and vice versa, and can transfer many types of media content for different purposes. Other possible applications could include for example, instant messaging, music streaming, game updates, etc. It will be understood that when the invention is used in such scenarios, real time monitoring of which objects are downloaded during game play for the purpose of revenue tracking may not be important. Likewise, there may be scenarios such as non-commercial applications where distribution or allocation of revenue shares is not necessary. This may be particularly true for applications where the objects are not related to advertising.

It will also be understood that while various embodiments have been described with regard to objects that are displayed by the interactive game program, the invention is also applicable to the embedding of other objects such as audio objects that are vocalized by the game program; as well as to audio/video objects having components that are both displayed and vocalized as appropriate.

It will also be understood that the software agent may be a separate software component for embedding within the game engine of a game program using a SDK. Alternatively, it may be provided as a separate component for interfacing with a pre-complied game allowing a game having a suitably formatted game engine to interface with the software agent.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method of interfacing with an interactive game program allowing for dynamic conveyance of objects during runtime, said program interfacing with a software agent, wherein the method is performed by a computer including a processor and a memory, wherein the memory includes instructions for causing the processor to perform the method, the method comprising:
    prior to the runtime of the interactive game program, allocating a locally stored dynamic policy to the interactive game program by a policy management server, based, in part, on a game identification;
    during the runtime of the interactive game program, receiving feedback data indicative of at least one parameter relating to at least one of a player of the interactive game program, the interactive game program, and a player station on which the program is run;
    customizing the locally stored dynamic policy on-the-fly by the policy management server, during the runtime of the interactive game program responsive to said feedback data indicative of said at least one parameter, allocating the customized dynamic policy on-the-fly, during the runtime of the interactive game program, thereby enabling revising display characteristics of the objects in a centralized automated manner for the entire interactive game program; and
    during the runtime of the interactive game program, retrieving and periodically conveying, by the software agent, the objects to the interactive game program based on any of: the locally stored dynamic policy, and the locally stored customized dynamic policy for embedding in the interactive game program;
    wherein said dynamic policy is configured to determine one or more characteristics of the objects and locations throughout the interactive game program in which one or more objects are to be displayed, said dynamic policy being configured to globally determine and revise the frequency, instance, and locations throughout the interactive game program in which said one or more objects are to be displayed.

2. The method according to claim 1, including communicating with one or more servers external to the player station.

3. The method according to claim 2, wherein communicating with said servers employs the hypertext transfer protocol.

4. The method according to claim 1, wherein the software agent conveys one or more of said objects to the interactive game program at periodic intervals that are set by the dynamic policy.

5. The method according to claim 1, further including monitoring and recording data indicative of exposure of said objects and user interaction therewith.

6. The method according to claim 5, further including reporting a revenue share of one or more entities involved in the creation of the object for each object conveyed.

7. The method according to claim 1, wherein the objects are advertising objects.

8. The method according to claim 2, including locally storing downloaded objects to enable conveyance of said objects to the game program when the player station is not connected to the external servers.

9. The method according to claim 1, including retrieving and conveying the data to the software agent via a digital rights management component external to the interactive game program.

10. A software agent for interfacing with an interactive game program run on a player station, wherein the software agent is executable by a computer including a processor and a memory, the software agent comprising:
- a display driver for acquisition and display by the interactive game program of a video sequence at a predetermined video stream rate and at a screen location configurable by the interactive game program, further synchronized with a sound stream, wherein the display driver includes a stream coordinator for processing video frames to create the synchronized video and audio streams;
- a flow coordination module for customizing on-the-fly, during the runtime of the interactive game program, a dynamic policy initially set by a centralized policy server;
- a JavaScript engine coupled to the display driver and to the flow coordination module and being configured to control the display of video streams according to any one of: the dynamic policy, and the customized dynamic policy; and
- a game interface that allows the software agent to be directly interfaced to a game engine within the interactive game program.

11. The software agent according to claim 10, further including an emulation module for receiving data relating to a player of the interactive game program and/or to the player station on which the program is run and for configuring said data to a web format for conveying to a non-dedicated web server.

12. The software agent according to claim 10, wherein the JavaScript engine further allows the software agent to interface with external JavaScript objects.

13. The software agent according to claim 12, including a serving scripts module that is coupled to the JavaScript engine for allowing external Java scripts to be loaded to the JavaScript engine for execution thereby.

14. The software agent according to claim 13, wherein the serving scripts module handles a serving decision for a publisher ad server and the player station.

15. The software agent according to claim 12, wherein the JavaScript engine is coupled to a hypertext transfer protocol (HTTP) client utilities module that allows the software agent to interface with the Internet using the HTTP.

16. The software agent according to claim 15, wherein the HTTP client utilities module also allows interfacing with data stored in the form of cookies on the player station.

17. The software agent according to claim 10, wherein the game interface is configured to interface the software agent to a game engine via a software agent interface of a different technology to that of the game engine, the software agent further comprising an interface adapter coupled to the software agent interface for adapting the software agent interface to the technology of the game engine.

18. The software agent according to claim 10, wherein the flow coordination module is coupled to the game interface for coordinating data flow.

19. A computer program comprising computer program code means for performing the method of claim 1 when said program is run on the computer.

20. A computer program as claimed in claim 19 embodied on a computer readable medium.

21. A software agent for interfacing with an interactive game program run on a player station allowing for dynamic conveyance of objects during runtime, wherein the software module is executable by a computer including a processor and a memory the software agent comprising:
- a flow coordination module for conveying to a policy management server first data indicative of at least one parameter relating to at least one of a player of the interactive game program, the player station on which the program is run, and the interactive game program, so as to allow the policy management server to use said first data to set a dynamic policy that is customized on-the-fly according to said at least one parameter, said dynamic policy being configured to determine one or more objects to be conveyed to the player station for embedding in the interactive game program, said dynamic policy being further configured to determine one or more characteristics of the objects, said dynamic policy being configured to globally determine and revise the frequency, instance, and locations throughout the interactive game program in which said one or more objects are to be displayed, said flow coordination module further receiving second data indicative of at least one parameter relating to at least one of: a player of the interactive game program, the player station on which the program is run, and the interactive game program so as to allow the flow coordination module to use said second data to customize on-the-fly said dynamic policy according to said at least one parameter; and
- a game interface for retrieving and periodically conveying the objects to the interactive game program based on any of said dynamic policy and the customized dynamic policy for embedding in the interactive game program, wherein the game interface allows the software agent to be directly interfaced to a game engine within the interactive game.

22. The software agent according to claim 21, further including an emulation module for receiving data relating to a player of the interactive game program and/or to the player station on which the program is run and for configuring said data to a web format for conveying to a non-dedicated web server.

23. The software agent according to claim 21, further comprising a JavaScript engine that allows the software agent to interface with external JavaScript objects.

24. The software agent according to claim 23, including a display driver coupled to the JavaScript engine and being configured to control how an object downloaded by the software agent is displayed.

25. The software agent according to claim 23, including a serving scripts module that is coupled to the JavaScript engine for allowing external Java scripts to be loaded to the JavaScript engine for execution thereby.

26. The software agent according to claim 25, wherein the serving scripts module handles the serving decision for a publisher ad server and the player station.

27. The software agent according to claim 23, wherein the JavaScript engine is coupled to a hypertext transfer protocol (HTTP) client utilities module that allows the software agent to interface with the Internet using the HTTP.

28. The software agent according to claim 27, wherein the HTTP client utilities module also allows interfacing with data stored in the form of cookies on the player station client machine.

29. The software agent according to claim 21, wherein the game interface is configured to interface the software agent to a game engine via a software agent interface of a different technology to that of the game engine and there is further provided an interface adapter coupled to the software agent interface for adapting the software agent interface to the technology of the game engine.

30. The software agent according to claim 21, wherein the flow coordination module is further configured to receive the data from a digital rights management component external to the interactive game program.

\* \* \* \* \*